G. V. PAYNE.
METHOD FOR ASCERTAINING THE LOCATION OF LEAKS IN UNDERGROUND FLUID PRESSURE PIPES.
APPLICATION FILED MAY 10, 1912.
1,041,156.
Patented Oct. 15, 1912.
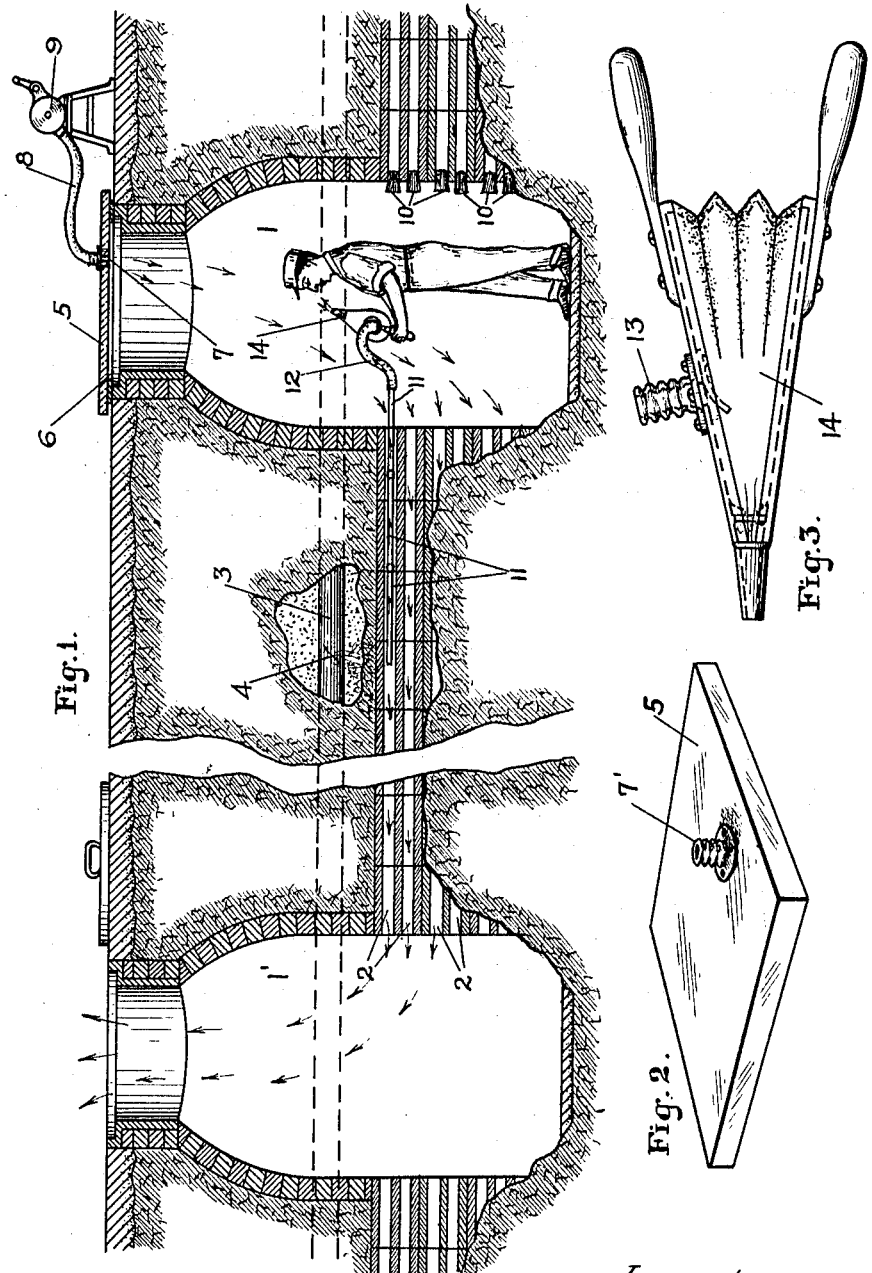
Witnesses.
R. W. Stone
A. A. Olson
Inventor
George V. Payne.
By Joshua R. H. Potts
his Attorney.

UNITED STATES PATENT OFFICE.

GEORGE V. PAYNE, OF CHICAGO, ILLINOIS.

METHOD FOR ASCERTAINING THE LOCATION OF LEAKS IN UNDERGROUND FLUID-PRESSURE PIPES.

1,041,156.   Specification of Letters Patent.   Patented Oct. 15, 1912.

Application filed May 10, 1912. Serial No. 696,403.

*To all whom it may concern:*

Be it known that I, GEORGE V. PAYNE, a citizen of the United States, and a resident of the city of Chicago, county of Cook, and State of Illinois, have invented a new and useful Method for Ascertaining the Location of Leaks in Underground Fluid-Pressure Pipes, of which the following is a specification.
My invention relates to a method for ascertaining the location of a leak in a fluid pressure pipe such as the conventional underground gas pipe, and has for its object the production of a method whereby the location of a leak in a pipe of the character mentioned may be ascertained with comparative ease and expedition.

Other objects will appear hereinafter.

With these objects in view, my invention consists in the combinations and arrangements of parts employed in the manner or method hereinafter described and claimed.

My invention will be more readily understood by reference to the accompanying drawing forming a part of this specification, and in which—

Figure 1 is a fragmentary sectional view through a section of ground, exposing the underground vaults, conduits and fluid pressure pipe and illustrating the employment of the method embodying my invention, Fig. 2 is a perspective view of a transparent closure plate employed in the practice of the invention, and Fig. 3 is a side elevation of a bellows which is used in the practice of the invention.

Referring now to the drawing, I have illustrated two vaults or manholes 1 and 1' which are embedded or sunk in the ground and constructed in the usual manner. Extending between the vaults 1 and 1' are conduits 2 which ordinarily serve to accommodate the electric, telegraph, or other wires which are buried below the surface of the ground, said conduits being formed, as is usual, of a plurality of alining sections, the joints between adjacent sections of said conduits being left not tightly closed so that gases or fluids in the ground in the vicinity may enter through said joints into the interiors of said conduits. Arranged adjacent the conduits 2 is a fluid pressure pipe 3, such as an ordinary gas pipe, through which is conveyed the illuminating gas. In the pipe 3 is shown the rupture or leak 4 which it is desired to locate in order that the leak or rupture may be stopped or repaired. The construction thus far described is old and well known, the same being used at the present time in most cities or towns of any considerable size.

In the practice of my invention, it is first determined between which two vaults the leak in the fluid pressure pipe has occurred, this being readily ascertained through the sense of smell, since upon a leak occurring in the fluid pipe, the fluid will permeate the soil in the vicinity and find its way to the conduits whence it will pass to and be discharged into the adjacent vaults. This being so, by removing the closures of said vaults, the presence of a strong odor will indicate that a leak has occurred adjacent thereto. After determining that the leak in the pipe 3 is located somewhere between the vaults 1 and 1', the covers of the latter are removed, and the upper end of the vault 1 closed by a transparent closure 5, preferably of glass, the transparent closure 5 being used so as to permit of the passage of light in order to illuminate the vault for operation therein. A felt packing or gasket 6 is preferably interposed between the upper edge of the vault and the under side of the closure 5 to insure a reasonably tight connection. The closure 5 is formed with an admission opening 7 over which is arranged a nipple 7' for connection with a flexible hose 8 which extends to a suitable manually operable blower 9, the arrangement being such that, when the blower 9 is operated, air will be forced downwardly into the vault 1 to create a draft through the conduits 2 in the direction shown by the arrows. The upper end of vault 1' is left open in order to permit of the escape of the air forced through the conduits 2 and the terminals of other conduits entering the vault 1 are preferably stopped by plugs or other suitable stopping devices 10 so as to positively insure the creation of a draft in the conduits 2. In the event of a wind blowing in the proper direction, the blower 9 may be dispensed with and the upper end of the vault 1 left open, since a wind blowing in the proper direction will create a draft through the conduits 2 practically as effectual as that created by said blowing device.

The creation of a draft in the direction shown and mentioned through the conduits

2, causes the forcing of the gases escaping from the leak 4 and entering said conduits, toward the vault 1', and so that the portions of said conduits between the point of entry of said gases into said conduits and the vault 1, will contain only fresh or sweet air which has been forced thereinto by the blower 9 or by reason of the draft created in said conduits.

A sectional pipe of comparatively small diameter is next inserted into one of the conduits 2 by one positioned in the vault 1, the section 11 of said pipe being successively connected so that the front end of said pipe will extend progressively into the conduit toward the point of entry of gas into said conduit. At intervals, the contents of the conduit at the front end of said pipe will be withdrawn for examination by the operator positioned in the vault. This withdrawal is effected by the connection of a flexible tube 12 with the rear end of said pipe, said tube being connected with a nipple 13 which is arranged over the intake port of an ordinary bellows or pneumatic 14. With this arrangement, upon the expansion of said bellows, a suction will be created in the pipe section 11 so as to withdraw a portion of the contents of the conduit in which the same are inserted, the contents thus withdrawn entering said bellows and being discharged therefrom when the latter is collapsed. In discharging the contents of said bellows, it may be readily determined by the sense of smell whether or not the same contains gases escaping from the leak 4. The contents of the conduit 2 withdrawn through the pipe formed by the sections 11, will continue to be fresh and uncontaminated until the front end of said pipe reaches the point of inlet of the escaping gases to said conduit, when, upon the withdrawal of gases through said pipe for examination, as above mentioned, the presence of a strong odor will serve to inform the operator that the front end of the pipe is positioned at the point of inlet of the escaping gases into the conduit. The length of the pipe inserted into the conduit is then computed, serving to definitely locate the position of the point of entry of gases thereinto. The point of leakage in the pipe 3 will necessarily be in close proximity to the point of entry into the conduit of the gases escaping from said pipe, and so that the location of the point of leakage in said pipe will thus also be determined. Having thus located the point of leakage in the fluid or gas pipe, the ground immediately above the same may be excavated so as to gain access thereto to repair or stop the leak.

At the present time no positive means or method is in use whereby a comparatively exact location of a leak in a gas or other similar pipe, such as is possible through the employment of the method above described, may be effected. At the present time, in order to ascertain the location of a leak, it has been customary to dig a number of holes in the ground along the pipe and in this way to strike or locate the leak by chance, a great amount of time and labor being thus expended. With my method, the location of a leak may be ascertained with great expedition and with little expenditure of labor.

While I have illustrated and described the preferred method and form of construction for carrying my invention into effect, these are capable of variation and modification without departing from the spirit of the invention. I, therefore, do not wish to be limited to the exact details of the method and construction set forth, but desire to avail myself of such variations and modifications as come within the scope of the appended claims.

Having described my invention, what I claim as new and desire to secure by Letters Patent, is:

1. The method of ascertaining the location of a leak in an underground fluid pressure pipe which consists primarily in creating a draft in one direction adjacent the leak, and secondarily in creating a suction in said draft in the opposite direction.

2. The method of ascertaining the location of a leak in an underground fluid pressure pipe which consists primarily in creating a draft in one direction adjacent the leak, and secondarily in creating a suction in said draft in the opposite direction by means of a pipe arranged in said draft.

3. The method of ascertaining the location of a leak in an underground fluid pressure pipe which consists primarily in creating a draft in one direction adjacent the leak, and secondarily in creating a suction in said draft in the opposite direction by means of a pipe arranged and progressively extended in said draft.

4. The method of ascertaining the location of the point of entry of fluid into a conduit which consists in first creating a draft in one direction through said conduit, second in inserting a pipe into said conduit, and then creating a suction in said pipe in a direction opposite to that of said draft.

5. The method of ascertaining the location of the point of entry of fluid into a conduit which consists in first creating a draft in one direction through said conduit, second in inserting a sectional pipe progressively into said conduit, and then creating a suction in said pipe in a direction opposite to that of said draft.

6. The method of ascertaining the location of the point of entry of fluid into a conduit open at both ends which consists in first creating a draft in one direction through said conduit by forcing air into one end thereof, second in inserting a pipe of a diameter less than that of said conduit into said end of the latter, and then intermittently creating a suction in said pipe in a direction opposite to that of said draft.

7. The method of ascertaining the location of the point of entry of fluid into a conduit which consists in first creating a draft in one direction through said conduit and then withdrawing some of the contents of said conduit at various points along its length at ascertainable distances from the end of said conduit for testing purposes.

8. The method of ascertaining the location of the point of entry of fluid into a conduit extending between and opening into two vaults, which consists in first forcing air into one of said vaults to create a draft in one direction through said conduit, second in inserting and progressively extending a pipe into said conduit from a position in said last mentioned vault, and third in intermittently creating a suction in said pipe in a direction opposite to the direction of said draft.

9. The method of ascertaining the location of the point of entry of fluid into a conduit extending between and opening into two upwardly opening vaults, which consists in first closing the upper end of one of said vaults with a transparent closure, second in forcing air into said vault to create a draft in one direction through said conduit, third in inserting and progressively extending a pipe into said conduit from a position within said last mentioned vault, and fourth in intermittently drawing some of the contents of said conduit at the front end of said pipe through the latter for examining the same.

10. The method of ascertaining the location of the point of entry of fluid into a conduit extending between and opening into two upwardly opening vaults, which consists in first closing the upper end of one of said vaults with a transparent closure, second in forcing air into said vault to create a draft in one direction through said conduit, third in inserting and progressively extending a pipe into said conduit from a position within said last mentioned vault, and fourth in connecting a bellows with the rearward end of said pipe for intermittently drawing some of the contents of said conduit at the front end of said pipe through the latter for examining the same.

In testimony whereof I have signed my name to this specification in the presence of two subscribing witnesses.

GEORGE V. PAYNE.

Witnesses:
JOSHUA R. H. POTTS,
ARTHUR A. OLSON.

Copies of this patent may be obtained for five cents each, by addressing the "Commissioner of Patents, Washington, D. C."